United States Patent
Jadav et al.

(10) Patent No.: US 10,830,593 B2
(45) Date of Patent: Nov. 10, 2020

(54) COGNITIVE FINGERPRINTING FOR INDOOR LOCATION SENSOR NETWORKS

(71) Applicant: International Business Machines Corporation, Armonk, NY (US)

(72) Inventors: Divyesh Jadav, San Jose, CA (US); Thomas D. Griffin, Campbell, CA (US); German H Flores, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 16/141,788

(22) Filed: Sep. 25, 2018

(65) Prior Publication Data

US 2020/0096345 A1 Mar. 26, 2020

(51) Int. Cl.
  *G01C 21/20* (2006.01)
  *H04W 4/024* (2018.01)
  *H04W 4/33* (2018.01)

(52) U.S. Cl.
  CPC .......... *G01C 21/206* (2013.01); *H04W 4/024* (2018.02); *H04W 4/33* (2018.02)

(58) Field of Classification Search
  CPC ....... G01C 21/206; H04W 4/024; H04W 4/33
  USPC ....................................................... 701/491
  See application file for complete search history.

(56) References Cited

U.S. PATENT DOCUMENTS

| 9,444,924 | B2 | 9/2016 | Rodriguez et al. |
| 9,484,046 | B2 | 11/2016 | Knudson et al. |
| 2012/0218436 | A1 | 8/2012 | Rhoads et al. |
| 2018/0007654 | A1* | 1/2018 | Wirola ................ H04W 40/244 |

OTHER PUBLICATIONS

Arkin et al., "Optimal Placement of Protective Jammers for Securing Wireless Transmissions in a Geographic Domain," IPSN, ACM, Apr. 2015, pp. 37-46

Krishnamachari, B., "An Introduction to Wireless Sensor Networks," Tutorial Presented at the Second International Conference on Intelligent Sensing and Information Processing (ICISIP), 2005, pp. 1-101.

Anonymous, "Method and System for Multi-perception Cognitive Mapping," IP.com Prior Art Database, Technical Disclosure No. IPCOM000236870D, May 20, 2014, pp. 1-2.

(Continued)

*Primary Examiner* — Geepy Pe
*Assistant Examiner* — Tiffany P Ohman
(74) *Attorney, Agent, or Firm* — Zilka-Kotab, P.C.

(57) ABSTRACT

Various embodiments of systems, computer program products, and computer-implemented methods for cognitive fingerprinting of an indoor location are disclosed. An exemplary embodiment of the inventive concepts includes: determining calibration information for using a sensing device within an indoor environment; generating instructions corresponding to one or more suggested location sensor placements throughout the indoor environment based at least in part on the calibration information; and issuing the instructions corresponding to the one or more suggested location sensor placements via the sensing device while a user operating the sensing device navigates the indoor environment. Additional features and embodiments of the inventive concepts are also described in this disclosure.

19 Claims, 3 Drawing Sheets

(56) References Cited

OTHER PUBLICATIONS

Anonymous, "Cognitive Activation of a Panic Mode of Operation for a Mobile Device," IP.com Prior Art Database, Technical Disclosure No. IPCOM000244895D, Jan. 27, 2016, pp. 1-5.

Anonymous, "Geo Beacon Position Verification," IP.com Prior Art Database, Technical Disclosure No. IPCOM000213414D, Dec. 14, 2011, pp. 1-5.

Kohne et al., "Location-based Services with iBeacon Technology," Second International Conference on Artificial Intelligence, Modelling and Simulation, 2014, pp. 315-321.

Mainetti et al., "A Survey on Indoor Positioning Systems," IEEE 22nd International Conference on Software, Telecommunications and Computer Networks (SoftCOM), 2014, pp. 111-120.

* cited by examiner

COGNITIVE FINGERPRINTING FOR INDOOR LOCATION SENSOR NETWORKS

BACKGROUND

The present invention relates to indoor location services, and more specifically, this invention relates to cognitive fingerprinting techniques and instrumentation for building and using indoor location sensor networks.

The use of Global Positioning System (GPS) to detect the location and direction of a client device (or GPS receiver), and thence to navigate from point A to point B is well established. The GPS receiver uses signals from at least four GPS orbiting satellites to calculate a three-dimensional Cartesian coordinate (with the Earth's center as origin) of the receiver device. The coordinates are often converted to the more well-known latitude and longitude and elevation above sea level system. GPS technology works very well for positioning, when there are no obstructions to the receipt of satellite signals.

However, the inside of a building is not so friendly. There are materials that absorb or dampen the satellite signals, which often renders GPS unusable inside a building. In contemporary society, users spend a big portion of their time inside a building—at work and/or for leisure. In a large building such as a mall, a warehouse, a university or corporate campus, a visitor often needs assistance to determine where he is in the building, and how to get from point A to point B.

Imaging technology may be utilized to track an individual's location throughout an indoor environment and has served as one approach prior to development of wireless technology and proliferation of mobile devices. Imaging based approaches such as video surveillance are undesirable due to the high expense associated with deploying a sufficient number of cameras throughout the environment, as well as need for human monitoring of footage in order to track an individual's location. While facial recognition and other image analysis technologies may one day enable robust partial or complete automation of image-based location tracking, at present these techniques tend to be unreliable to provide an adequate solution without expensive and time-consuming human monitoring.

Wi-Fi technology is one existing avenue for providing indoor location services, whereby a user's location is determined based on the signals of one or more wireless networking device, e.g. wireless router, deployed throughout the environment. While suitable for providing a general location of a user, most enterprises would prefer not to expose and use their Wi-Fi networks for orthogonal uses such as Wi-Fi real-time location system (RTLS) positioning and routing, primarily for performance and security exposure reasons. Moreover, enterprises typically prefer not to expand their existing Wi-Fi network infrastructure, e.g. adding additional Wi-Fi access points, to increase coverage and reliability necessary for accurate location determination, due to additional installation and maintenance costs.

Some indoor environments are equipped with radio frequency identification (RFID) systems whereby "tags" (or transmitters) are placed throughout a location and/or affixed to movable objects (e.g. boxes, vehicles, robots, etc.) to glean location information based on communication between the tags and one or more RFID readers. Tags may be passive, or active (including some independent power source such as a battery) and have corresponding limitations including but not limited to range/sensitivity (especially for passive tags) and/or limited shelf life (especially for active tags). As a result, RFID solutions tend to be quite expensive to deploy and maintain over time.

While RFID offers advantages over other technologies (e.g. infrared, ultrasound, Wi-Fi, and camera-based approaches), RFID suffers from several critical disadvantages, including the use of disparate, potentially incompatible signaling frequencies used in different locations/industries, the need for a power source to power either the tag or the reader, and the large number of RFID tags or readers typically required to provide desired coverage (which primarily drives the high cost of RFID solutions).

Accordingly, it would be beneficial to provide novel and useful systems, methods, and computer program products for facilitating deployment of a precise, functional location sensor network in an indoor environment.

SUMMARY

According to one embodiment, a computer-implemented method for cognitive fingerprinting of an indoor location includes: determining calibration information for using a sensing device within an indoor environment; generating instructions corresponding to one or more suggested location sensor placements throughout the indoor environment based at least in part on the calibration information; and issuing the instructions corresponding to the one or more suggested location sensor placements via the sensing device while a user operating the sensing device navigates the indoor environment.

According to another embodiment, a computer program product for cognitive fingerprinting of an indoor location includes a computer readable medium having program instructions embodied therewith. The computer readable medium is not a transitory signal per se, and the program instructions are executable by a sensing device to cause the sensing device to perform a method comprising: determining, using a processor of the sensing device, calibration information for using the sensing device within an indoor environment; generating, using the processor of the sensing device, instructions corresponding to one or more suggested location sensor placements throughout the indoor environment based at least in part on the calibration information; and issuing, via the sensing device, the instructions corresponding to the one or more suggested location sensor placements while a user operating the sensing device navigates the indoor environment.

According to yet another embodiment, a system for cognitive fingerprinting of an indoor location includes: a processor; and logic integrated with the processor, executable by the processor, or integrated with and executable by the processor. The logic is configured to: determine calibration information for using a sensing device within an indoor environment; generate instructions corresponding to one or more suggested location sensor placements throughout the indoor environment based at least in part on the calibration information; and issue the instructions corresponding to the one or more suggested location sensor placements via the sensing device while a user operating the sensing device navigates the indoor environment.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products employing cognitive instrumentation to deploy location sensors, provide location services to users within the indoor environment, track an individual's location throughout the indoor environment, among others.

As noted above, recent location services have turned attention to providing accurate, precise location information and associated services in indoor environments. However, conventional technologies utilized for determining location outdoors, such as GPS, are not generally applicable to the same task in an indoor environment, and existing solutions for gleaning location information indoors, such as imaging, Wi-Fi, and/or RFID-based approaches may be prohibitively expensive and/or inaccurate.

One possible alternative instrumentation is known as Bluetooth Low Energy (BLE) beacon. Hereinafter, the terms "beacon" and "BLE beacon" are used interchangeably and should be understood as referring to Bluetooth Low Energy beacons in all instances, regardless of the particular communication protocols or software employed by the beacon (e.g. iBeacon, Eddystone, etc.) BLE beacons are of increasing interest as an indoor proximity sensing technology. BLE beacons are attractive as they are inexpensive (tens of dollars per device), require little to no maintenance (one to about ten years of battery life depending on technology, battery management, and usage), and are compact and portable (can be used in most places). However, determining how to properly deploy an indoor positioning network based on BLE beacons is not straightforward, and requires great care and attention to detail.

Accordingly, the presently disclosed inventive concepts relate to cognitive techniques for deploying an indoor location sensor network, preferably using BLE beacons as location sensors, and one or more sensing devices to cognitively guide the deployment process.

As referenced herein, the term "location sensor" shall be understood as any type of device capable of broadcasting a signal, or signals, from which the location and preferably the identity of the sensor may be determined. Broadcasting may include actively transmitting signal(s), reflecting received signal(s), or any equivalent thereof that would be appreciated by a person having ordinary skill in the art upon reading the present disclosure. In various embodiments, exemplary types of location sensors include, but are not limited to, Wi-Fi access points, GPS devices, RFID devices, beacons such as Bluetooth Low Energy (BLE) beacons, of any variety and in any combination, without limitation, as well as equivalents thereof that a skilled artisan would appreciate upon reading this description.

As understood herein, "sensing devices" refer to any type of device, preferably a mobile device such as a handheld computer, personal digital assistant, tablet, smartphone, and any equivalents thereof that would be understood by skilled artisans reading this description as capable of receiving signals from location sensors deployed throughout an environment, and processing such signals (e.g. using dedicated application software, a dedicated API, and/or services running on or otherwise provided to/by the sensing device) to determine a location of the location sensor sending the signal. Preferably, the sensing device also includes a graphical display and/or auditory components such as a microphone and speakers to provide visual and/or auditory information to the user, as well as receive input from the user, e.g. via a touchscreen or the microphone. The sensing device also preferably serves as a primary interface between the system and the user/client, and facilitates cognitive aspects of the invention, as described in greater detail below.

The exemplary embodiments shall be understood as related and various features of one may be applied to the other without departing from the scope of the present disclosure.

Preferably, the various embodiments of the presently disclosed inventive concepts are "cognitive" in the sense that location sensor data are collected, at least during a training phase, via a user manipulating a sensing device, e.g. iPhone or tablet, or equivalent thereof having inertial sensors and tactile/capacitive sensors capable of detecting a user's manipulation of the sensing device, e.g. by tilting, tapping, dragging, pinching, spreading, waving, shaking, or any other suitable gesture and/or motion-based input that may be provided to and interpreted by the sensing device, etc.

In one embodiment, training includes user manipulation of the sensing device, which preferably resembles motions performed, for example, when solving a puzzle/maze where the user needs to manipulate the orientation of a device to cause a ball to navigate through a series of obstacles (walls, holes, etc.). In the context of the presently disclosed inventive concepts, the user preferably interacts with a sensing device via one of the aforementioned interactive methods to provide, as input to the system, various types of information, e.g. system calibration parameters, tilt of the device in direction of travel, building ID, etc. If the user does not provide these values, the system recommends appropriate values, based at least in part on: previous executions of the system, previously stored values from or based on a user's profile, and/or a predetermined bank of values suited to provide representative values, e.g. mean, median, mode, etc.

The training process may also, in certain embodiments, involve, preferably using a sensing device, interacting with the user via acoustic, verbal, and/or visual cues, commands, notifications, e.g. to indicate when the user should start to walk, tilt the sensing device in the direction of travel, etc. as would be understood by a person having ordinary skill in the art upon reading the present descriptions.

Again in the context of training, the sensing device may additionally or alternatively display information regarding an ongoing fingerprinting process, including but not limited to where and when the user has already traversed within the environment, location sensor identifying information, sensor values produced by the inertial sensors and/or other sensors of or integrated with the sensing device, etc.

In various embodiments, any or all information collected during training is preferably stored in a local repository on the sensing device, and/or remotely, e.g. via a cloud service, for future analysis and/or usage. For example, such information may be utilized to suggest appropriate values when not provided by a user, as described hereinabove, in one approach.

The location sensor data collected, at least during this training phase, are processed and analyzed to recommend how to reposition already deployed location sensors, and/or where to place additional location sensor(s) in order to increase or improve coverage, and/or avoid areas where the location sensor signal is weak and/or non-existent; and using this training data, the system may learn from the current and/or other collections. This ability is particularly useful for informing the user of any changes in the system (e.g. addition of location sensors, change in location sensor locations, etc.) and/or the environment (e.g. presence of new obstacles and/or sources of signal interference, absence of previous obstacles and/or sources of signal interference, changes in the physical layout of the environment, etc. as would be understood by a person having ordinary skill in the art upon reading the present descriptions.

According to one general embodiment, a computer-implemented method for cognitive fingerprinting of an indoor location includes: determining calibration information for using a sensing device within an indoor environment; generating instructions corresponding to one or more suggested location sensor placements throughout the indoor environment based at least in part on the calibration information; and issuing the instructions corresponding to the one or more suggested location sensor placements via the sensing device while a user operating the sensing device navigates the indoor environment.

According to another general embodiment, a computer program product for cognitive fingerprinting of an indoor location includes a computer readable medium having program instructions embodied therewith. The computer readable medium is not a transitory signal per se, and the program instructions are executable by a sensing device to cause the sensing device to perform a method comprising: determining, using a processor of the sensing device, calibration information for using the sensing device within an indoor environment; generating, using the processor of the sensing device, instructions corresponding to one or more suggested location sensor placements throughout the indoor environment based at least in part on the calibration information; and issuing, via the sensing device, the instructions corresponding to the one or more suggested location sensor placements while a user operating the sensing device navigates the indoor environment.

According to yet another general embodiment, a system for cognitive fingerprinting of an indoor location includes: a processor; and logic integrated with the processor, executable by the processor, or integrated with and executable by the processor. The logic is configured to: determine calibration information for using a sensing device within an indoor environment; generate instructions corresponding to one or more suggested location sensor placements throughout the indoor environment based at least in part on the calibration information; and issue the instructions corresponding to the one or more suggested location sensor placements via the sensing device while a user operating the sensing device navigates the indoor environment.

Figure 1:
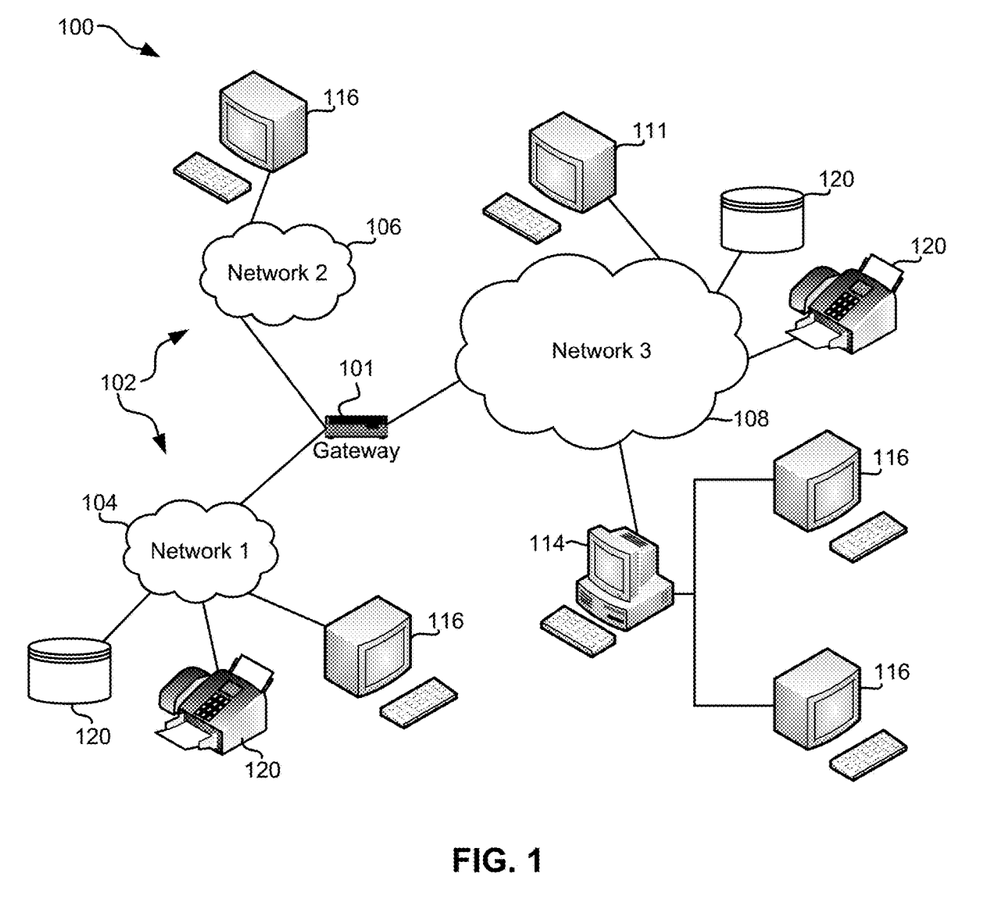
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
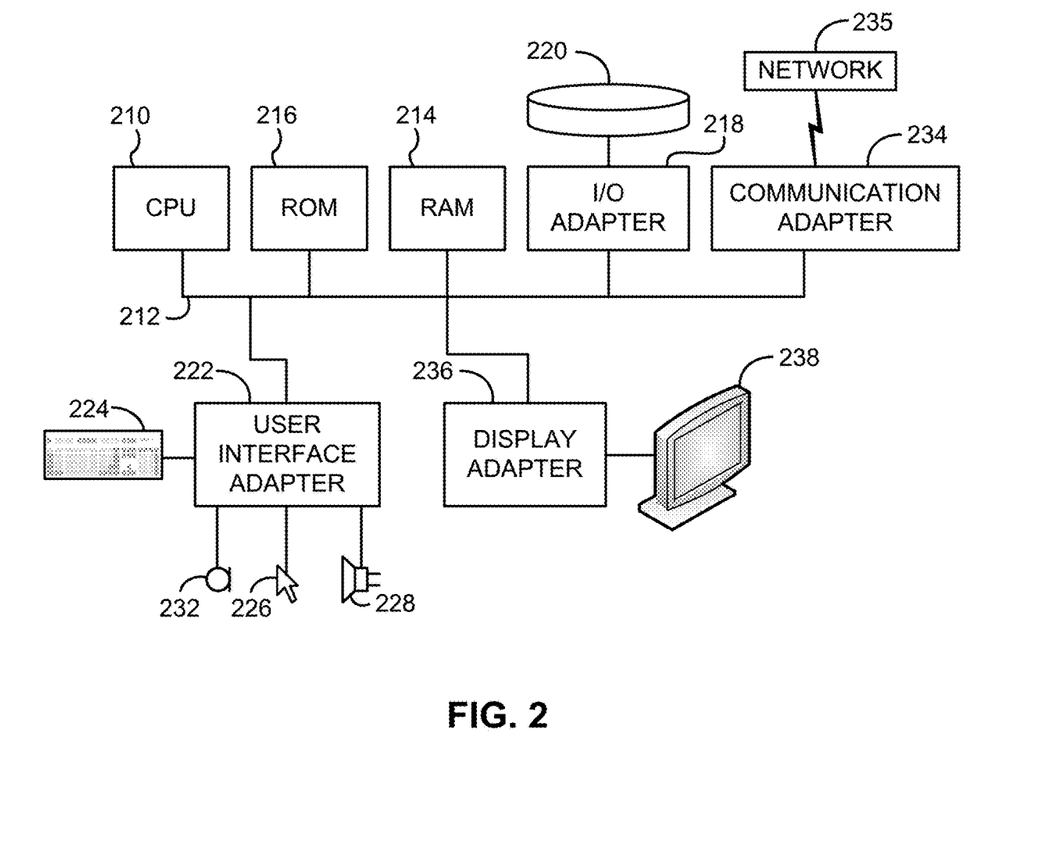
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Cognitive Instrumentation for Location Sensor Networks

Conventional approaches to deploying indoor location sensor networks generally rely heavily on the use of floor maps and brute force deployment of location sensors to boost the accuracy and reliability of indoor location services using an approach known as "fingerprinting."

Traditional fingerprinting techniques require the collection of training data at known locations given a known, accurate map of the indoor/outdoor environment. Again, in the context of traditional fingerprinting, the training phase requires a person or system to segment the map into a grid of cells, where center points of adjacent cells are separated by a predetermined distance, typically on the order of about 0.5 meters, 1 meter or some other granularity specified by the user. Once the map is compartmentalized into cells, received signal strength indicators (RSSIs) and location sensor identifying information, e.g. major ID, minor ID, UUID in the case for BLE beacons, are collected at each and every accessible one of the cells for a predetermined amount of time and annotated with the (X,Y) location of the cell. The (X,Y) location-annotated location sensor data is saved in a repository for use during a testing phase and/or by an analytics engine, e.g. to determine if there are any areas with no coverage.

As will be appreciated by those having ordinary skill in the art, the process of compartmentalizing a map (e.g. an image of an indoor space) into a grid of equidistant cells and collecting sensor data at each of the cells for a predetermined amount of time is very labor intensive. Furthermore, if the infrastructure of the environment is modified (e.g., due to construction work, rearrangement of furniture, etc.), the previously determined fingerprint set is no longer valid, requiring recollection of the copious location sensor data and corresponding undesirable use of resources.

Accordingly, the presently described inventive concepts facilitate mapping a location for deployment of location sensors in a manner that is cognitive, as defined herein.

The invention in preferred embodiments makes use of the inertial sensors (e.g. accelerometer, magnetometer, and/or gyroscope), wireless sensors (e.g. Bluetooth 4.0 and/or Wi-Fi), and/or multi-touch capabilities found in mobile devices and/or sensing devices to (1) automate and optimize the process of location sensor deployment, and (2) ease the process of collecting training data during the training phase of the fingerprinting technique. Having a system that employs these technologies will greatly facilitate the process of deploying location sensors in indoor and outdoor environments (e.g., retail stores, city parks, school playgrounds), and using them along with any other sensor data for localization purposes.

At a high level, implementing various embodiments of the presently disclosed inventive concepts conveys advantages and simplifies/improves the deployment and operation of location sensors in indoor environments by automating identification of deployed location sensors; gathering signal strength information from various location sensors deployed throughout the environment; automating identification of "dead zones" where signal was expected but not detected, and/or other zones where the signal is not optimal; collecting training data in a cognitive manner via user manipulation of a sensing device while navigating through the environment; a hysteresis-based approach; and automating calibration of user movement throughout the environment, based on customized analysis of the user's stride length, known map pixel to distance ratio (e.g. one foot per pixel, one meter per pixel, multiple pixels per meter, multiple pixels per foot, etc. as would be understood by a person having ordinary skill in the art upon reading the present disclosure, for instance in one illustrative embodiment the pixel to distance ratio was found to be about fourteen pixels per meter, and about four pixels per foot), and tilt sensitivity of the sensing device.

By employing a "hysteresis-based approach" the present disclosures account for the history of locations where the user has already collected training data, and avoids repeating training data collection, saving time and resources. In addition, knowing where the data collection started or ended helps in the case the user for example, collects training data throughout one path, stops the system, e.g. to take a break or to analyze the data that has just been collected, and later comes back to continue collecting training data. For instance, in one embodiment, a "hysteresis-based approach" involves marking on a map the locations where location sensor data has been collected to facilitate future data collections, e.g. not having to gather signal strength information for various location sensors in areas previously visited, and being able to collect training data in multiple runs, which need not be consecutive.

The inventive concepts presented herein include four main phases: (1) pre-configuration of location sensors, (2) system calibration, (3) location sensor placement optimization, and (4) collection of training data. It shall be understood that various features described herein with respect to the individual phases may be utilized in other phases, in any combination and without limitation. Moreover, in some embodiments features described with respect to one phase may be substituted with or for feature(s) described with respect to another phase. Accordingly, insofar as capable of performing the cognitive fingerprinting techniques described herein, various embodiments of the inventive concepts shall be understood as modular, capable of being combined in any suitable fashion that would be appreciated by a skilled artisan reading the present disclosure.

Pre-Configuration

In the pre-configuration phase, a user configures the location sensors using the application provided by the vendor and uploads a map of the indoor or outdoor environment that is to be equipped with location sensors.

Configuring location sensors may be performed automatically, manually, or some combination thereof, in various approaches. In preferred embodiments, configuring location sensors involves defining and/or modifying one or more unique identifiers to differentiate among other location sensors within the location. Location sensors may come from a vendor with predefined identifiers, and/or an authorized user may modify certain location sensor identifiers during pre-configuration, e.g. using an application, service, etc. provided by the vendor. In another embodiment, configuring location sensors involves setting and/or modifying a location sensor's operating characteristics, including but not limited to, the broadcast rate, signal type, security protocol, power level, and/or any other operating characteristic allowed by the vendor.

For the purposes of the present disclosure, location sensors such as BLE beacons are identified using three identifiers, a major ID, a minor ID, and a universally unique identifier (UUID). In accordance with one embodiment of the presently disclosed inventive concepts, the UUID is defined in association with geographic location information corresponding to the geographic site where the beacon is to be deployed, e.g. a mall, ballpark, corporate site, etc. The major ID may be defined, in the same and/or other embodiments, in association with a sublocation within the geographic site, e.g. a building of a complex, floor of a building, etc. Further still, the minor ID may be defined, in various embodiments, in association with a still more specific sub-sublocation, such as a room, aisle, or other area of a floor, workstation within a room or area, etc. as would be appreciated by a person having ordinary skill in the art upon reading the present descriptions.

Notably, in various embodiments the different BLE beacon identifiers may be associated with different types of information, such as an individual with whom the beacon's location is/will be associated (e.g. the individual's office or desk), or different types of access level/restriction associated with the area in which the beacon is/will be installed, etc. as would be appreciated by persons having ordinary skill in the art once having fully reviewed the inventive concepts described herein. Preferably, whatever scheme or information is represented by and/or associated with the various beacon identifiers, such information is associated/organized in a hierarchical manner such as described above with reference to the location/sublocation/sub-sublocation example.

According to select embodiments of the presently described inventive concepts, location sensor ID naming suggestions could be automatically provided to facilitate the overall configuration of the location sensors. For example, by scanning for nearby location sensors, a system could suggest using location sensor IDs that are randomly generated, serially generated, etc. to avoid conflict with other location sensors already deployed within the vicinity.

At any rate, pre-configuring location sensors preferably includes defining and/or modifying one or more location sensor identifiers such that each location sensor to be deployed within the environment is characterized by a unique combination of the identifiers. The identifiers may be randomly assigned, and/or may be associated with locations, individuals, access restrictions, or any other logical description of an indoor location via these identifiers, and the association may be stored in a knowledge base, e.g. within the vendor's API, and/or an application or service provided to the location owner/operator. Most preferably, the identifiers are associated with various portions of a map and may be displayed visually to an authorized user upon request during pre-configuration and/or thereafter, e.g. during location sensor placement optimization in one embodiment.

Once each of the location sensors ID is set, the next pre-configuration step includes providing/uploading a map of the indoor location where the location sensors are to be deployed. This master image is also used subsequently for location sensor placement optimization and in the course of the training phase, according to preferred embodiments, and therefore represents an important component of the presently disclosed inventive embodiments. The map may take any suitable form described herein in various embodiments, and preferably is a to-scale map of the floorplan, layout, or a blueprint of the indoor location.

Preferably, the map is or includes an image of the indoor location, the image defining at least all outer boundaries between the indoor environment and the "outside" as well as any internal structures and/or large obstacles/features, such as walls, doorways, furniture, statues, fountains, or other aesthetic features which present an obstruction to human movement throughout the location. Moreover, the map preferably depicts all positions where location sensors are/will be deployed throughout the environment, in one embodiment, or depicts plausible locations where location sensors are/will be deployed throughout the environment, in other embodiments.

In particularly preferred approaches, the map may be provided in the form of a floor plan, layout, or blueprint. More preferably, the map is a scale representation of the indoor environment and most preferably has a known pixel to distance ratio (e.g. one foot per pixel, one meter per pixel, multiple pixels per meter, multiple pixels per foot, etc. as would be understood by a person having ordinary skill in the art upon reading the present disclosure, for instance in one illustrative embodiment the pixel to distance ratio was found to be about fourteen pixels per meter, and about four pixels per foot). However, so long as the scale of the map is known, and shown on the map, the pixel to distance ratio may be determined from the image of the map itself based on the image resolution. Preferably, the pixel to distance ratio is calibrated in the calibration step to ensure maximum accuracy.

Calibration

The calibration phase, in one embodiment, involves calibrating with regard to three parameters: pixel to distance ratio, stride length estimation, and tilt sensitivity. Of course, calibration may be required or performed for other parameters and/or components of the sensing device, such as the inertial sensors, in one approach.

The pixel to distance ratio parameter is a scale factor used to determine the mapping between a pixel in the image to the length, in meters or other unit of length, that the pixel represents in the environment. Since an image is represented in pixels and the movement of a user or moving object is represented in meters or other unit of length, the pixel to distance ratio allows the conversion from one reference system to the other. This is useful when wanting to know how far, in meters, a user or moving object (e.g., a bus) has traveled from one location to another.

In various embodiments, to set this pixel to distance ratio parameter the user may measure the number of pixels in the image that exactly maps to one meter, two meters, or any other specified length within the indoor environment. For example, in one approach a user selects the length of an object (e.g., corridor width, corridor length, or space between two adjacent doors, etc.) in the image (e.g. by tapping the screen to select the start and end points of the length of the object shown in the map image) and manually measures that object with a measuring tape or similar appropriate measuring tool. This value could be estimated, but the more accurate it is, the better the subsequent location sensor placement suggestions are, and training data collected thereafter.

The stride length parameter is a constant value that reflects the distance covered as a given user takes one step. This parameter is used to determine how far the user has traveled in one step, either in pixels or meters. To calculate this parameter, the user, again operating an application or service provided via the sensing device, is directed to walk a predetermined distance (e.g. by tapping the screen to select the start and end points to walk) and count the number of steps walked. The number of steps walked and the distance selected serve as input to the application or service, and the ratio of these two numbers is then used to determine the stride length. Other known stride length estimation models, e.g. combination of height and step frequency, or equivalents thereof that would be appreciated by a person having ordinary skill in the art may be employed in other approaches without departing from the scope of the present disclosure.

The tilt sensitivity parameter is a predetermined threshold value that determines the degree of tilt that needs to be detected by the inertial sensors of the sensing device to register a tilt for purposes of sensing device location and training data collection. For example, if the tilt sensitivity is set to ten degrees and the user tilts the sensing device to the right, the system registers that the device is tilted to the right, if and only if the user is tilting the device at or more than ten degrees. If the device is tilted less than ten degrees, no tilting event is detected. This parameter ensures that minor rotations to the sensing device are not registered, reducing the amount of data processing necessary and avoiding false positive "movements" from minor inconsistencies while handling of the sensing device.

In various embodiments, calibrating the stride length parameter and/or the tilt sensitivity parameter is optional, although each parameter is preferably calibrated to facilitate overall system accuracy. For instances in which these parameters are not calibrated, an average human stride length may be utilized, and/or a default tilt sensitivity parameter specified, in several approaches.

Sensor Placement and Placement Optimization

Another phase of the inventive fingerprinting technique, in accordance with preferred embodiments, involves placing the configured location sensors in suggested locations throughout the environment. To place the location sensors, in one embodiment the user is instructed (again, via the sensing device application, an associated service, etc.) to place one of the location sensors in a location of preference, preferably not in a corner location and away from nearby Wi-Fi access points, as these places have been empirically shown to be suboptimal locations due to interference and/or locations where the signals are not well distributed.

Once the first location sensor is placed at a proper location, the system visually or verbally (e.g. visually via textual notifications, and/or audibly by using a text-to-speech engine) instructs the user to walk along an area where the location sensors are to be deployed. As the user walks around, the system suggests locations where to place the next location sensors based on the received signal strengths from nearby location sensors. For instance, after the first location sensor is placed, the user is instructed to move in a direction away from that location sensor until the sensing device detects the received signal strength for signals coming from the location sensor is less than a predetermined minimum signal strength threshold. In response to detecting the signal strength is less than the minimum signal strength threshold, an instruction to place a new location sensor is issued.

Moreover, if two identical location sensors (e.g. having the same location sensor ID) are found, the system alarms the user of the conflict and offers a suggestion.

As the user continues placing location sensors throughout the environment, the system actively scans for all location sensors within range as the user traverses the environment, and based on received signal strength predicts an optimal location in order to minimize or eliminate "grey areas" (areas where no location sensors are detected), "dense areas" (too many location sensors within an area), and "areas where there is a lot of signal interference" (e.g., near Wi-Fi APs or near an area that degrades the signal due to, for example, the presence of obstacles). Once the entire location is populated with location sensors (e.g. no grey areas or dense areas exist within the environment, and at least one location sensor signal is detectible above or equal to a minimum signal strength threshold at all locations within the environment), the location sensor network is ready for use. The minimum signal strength threshold is a value that can be learned from training data or set by the user. For instance, in one exemplary embodiment, the RSSI of beacon A at 0 meters is −55, and the threshold is set to −70× meters away from beacon, then any RSSIs >=−70 ([−55, −70]) are considered strong signals. Any RSSI beyond the threshold −70, e.g., −72, is considered weak since −72<−70.

Offline/Training Phase

In some approaches, the inventive concepts extend beyond the first three phases described above. Once such phases have been completed, the last step is to collect location sensor data where the location sensors were deployed in the previous step. This training phase instructs a user to walk around an area of interest and use an interface provided in the application to annotate the location sensor readings with an (X, Y) location. To facilitate the process of detecting the current location of the user as he or she walks around the area of interest, the system makes use of the inertial sensors and the parameters set in the calibration phase to calculate the (X, Y) location of the user in real time. In one embodiment the Core Motion framework may be utilized to provide access to the inertial sensor data found in iOS devices, to determine the orientation of the device.

In a preferred approach, Euler angles (representing an orientation of the device with respect to a fixed reference system where the z-axis of the device is parallel to the Earth's gravitational pull (e.g. "normal"), and the x-axis is arbitrary) are used to determine the tilt of the device, e.g. based on sensor data from a gyroscope, magnetometer, accelerometer, etc. present within the sensing device. As a user walks around the area of interest holding a sensing device while using an application facilitating the collection of location sensor data, he or she is asked to tilt the sensing device in the direction of movement. If the sensing device is tilted at an angle greater or equal than the tilt sensitivity parameter set in the calibration phase, the location of the user is updated.

This user-generated input to the system represents one of the cognitive aspects of the invention, in that rather than requiring a human to exhaustively explore a space in grid wise fashion, the user may walk naturally through the environment, using their own cognitive judgment as to the best way to traverse and/or occupy the space. When combined with location sensor data, the result is a cognitive fingerprinting technique exhibiting the advantages described above, among others. Of course, it will be understood that the cognitive aspects of the presently described inventive concepts, according to various embodiments, may include any number or combination of cognitive features as described herein.

In one embodiment, cognitive input is graphically displayed in the application by a geotag overlaid over the map image uploaded during the pre-configuration phase. As the user keeps walking and tilting the sensing device, the geotag keeps advancing. At the same time, the app collects inertial sensor data and location sensor advertisement packets and timestamps these data points along with the (X, Y) location shown by the geotag. Accordingly, the training process builds a sensor signature map of the environment as users walk around therein. These signatures serve, in one embodiment, as the training/offline phase of the inventive technique to predict users' locations during the testing/online phase.

As training data are collected, the location information included with the location sensor readings may be analyzed, e.g. using a nearest neighbor algorithm or other known approach, to determine distance between predicted signal/location pairs and observed signal/location pairs to optimize the placement of location sensors throughout the environment.

In various approaches, location sensor placement/optimization and training may be performed iteratively to refine the optimal location of location sensors within the environment. This iterative repetition of location sensor placement and training also facilitates constant adaptation to any changes in the environment (e.g. with respect to layout, signal interference, etc.) without requiring remapping the entire facility, or a substantial portion thereof, as is required for traditional grid-based fingerprinting techniques, which may be time consuming and incur additional costs; or the process may be done sequentially, first by deploying the location sensors in optimal locations, and then collecting training data thereafter.

While the foregoing descriptions present the inventive concepts in the context of particular phases performed in a particular order, it should be understood that certain aspects of each phase may be performed in a different order than set forth above. Some functions may be performed simultaneously in other approaches, and/or certain embodiments may omit certain functions or sub-functions described herein, all without departing from the scope of the presently disclosed inventive embodiments. For instance, according to the embodiment shown in FIG. 3, described below, pre-configuration and training may be considered separate, optional operations from that of the core technique.

Figure 3:
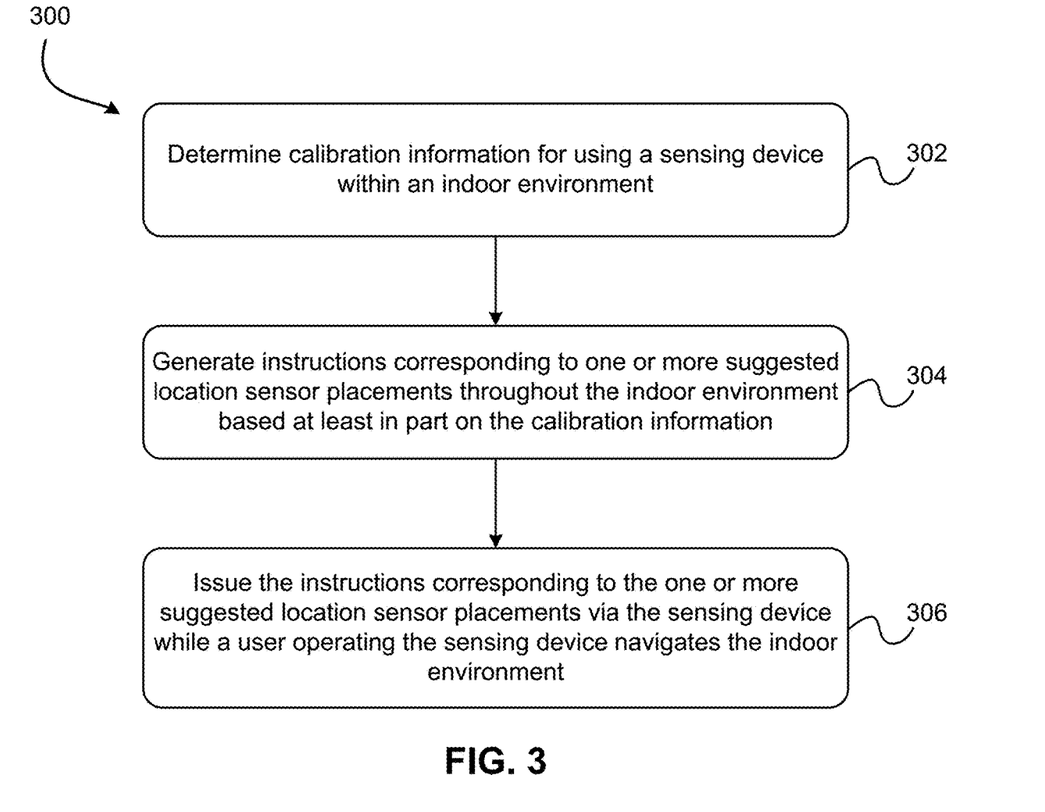
FIG. 3 is a flowchart of a method for cognitive fingerprinting of an indoor location, according to one embodiment.

Accordingly, in FIG. 3 a method 300 for cognitive fingerprinting of an indoor location is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a mobile device, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where calibration information for using a sensing device within an indoor environment is determined. The calibration information may include any type described herein, but preferably includes at least a pixel to distance ratio to determine the mapping between a pixel or group of pixels in the image to the length, in meters or other unit of length, that the pixel or group of pixels represents in the environment.

Determining the pixel to distance ratio may be performed substantially as described hereinabove, e.g. by a user measuring a physical distance corresponding to an object depicted on a map uploaded to the mobile device and depicting a scale representation of the indoor environment. Other suitable techniques described herein, e.g. based on the image itself, may also be employed without departing from the scope of operation 302. Of course, in more embodiments, the calibration information may additionally or alternatively include a stride length corresponding to a user operating the sensing device; and/or a tilt sensitivity of the sensing device.

With continuing reference to FIG. 3, in operation 304 method 300 includes generating instructions corresponding to one or more suggested location sensor placements throughout the indoor environment based at least in part on the calibration information. Preferably, the instructions are generated as a user manipulating the sensing device navigates throughout the indoor environment and is further based on signal strength of signal(s) received from one or more location sensors placed throughout the indoor environment. As such, at the initiation of method 300, e.g. prior to placement of the first location sensor, a location sensor location may be suggested based on perceived signal transmission characteristics (e.g. based on physical arrangement of a location and/or presence of interfering signals such as Wi-Fi access points), while thereafter suggestions may be based on signal strength of signals received from the location sensors placed throughout the environment.

Accordingly, in several implementations the inventive concepts represented by method 300 may include monitoring signal strength (e.g. via RSSIs) as the user moves away from location sensors, determining whether and when the signal strength drops below a predetermined minimum signal strength threshold, and suggesting placement of a new location sensor at or near a location corresponding to the received signal strength dropping below the predetermined minimum signal strength threshold. By repeating this general process, an entire location may be covered by location sensors with sufficient signal strength to ensure location services are available throughout the location.

To facilitate such an outcome, method 300 includes operation 306, in which the instructions corresponding to the one or more suggested location sensor placements are issued via the sensing device while a user operating the sensing device navigates the indoor environment.

Of course, skilled artisans reading the present descriptions will appreciate that the foregoing description of method 300 is in no way limiting on the scope of the various features, operations, functions, etc. that may be included therein/therewith, in any combination or permutation. Rather, it shall be appreciated that method 300 may include any combination or permutation of such features, operations, functions, etc. as described herein and without limitation.

For instance, in several exemplary embodiments, method 300 may include a pre-calibration phase and/or training phase as described hereinabove.

As a brief recap, the pre-configuration phase, in one approach, may include configuring one or more identifiers of a plurality of location sensors to be deployed throughout the indoor environment. In another embodiment, configuring location sensors involves setting and/or modifying a location sensor's operating characteristics, including but not limited to, the broadcast rate, signal type, security protocol, power level, and/or any other operating characteristic allowed by the vendor.

Preferably, the identifiers for each location sensor are independently configured in a hierarchical manner defining a location within the indoor environment where the respective location sensor is deployed or will be deployed. Additionally, or alternatively, identifiers may define or correspond to particular individuals, access restrictions, etc. within the confines of the indoor environment. In any event, the identifiers are preferably stored in association with the corresponding location, individual, access restriction, etc. in a separate knowledge base, which may be maintained on the sensing device, a central server, or the like, in various approaches.

The training phase, in another approach, generally includes collecting location sensor signals (e.g. signal strength data and/or identifying information) from a plurality of location sensors while navigating through the indoor environment, each location sensor being positioned at one of the suggested location sensor placements; annotating the collected location sensor signals with (X, Y) coordinate location information corresponding to the plurality of location sensors; and generating a new set of suggested location sensor placements based on the annotated location sensor signals. Of course, in preferred embodiments collection of location sensor data is cognitive and comprises the user manually manipulating the sensing device in three dimensions while navigating through the indoor environment, the manipulations indicating the user's physical movement throughout the indoor environment. In various embodiments, the (X, Y) coordinate location information may identify the location of the location sensor, and/or may identify a location of a sensing device proximate to the location sensor. In either case, the location information shall be understood as corresponding to the location sensor.

In a particularly preferred embodiment, the inventive concepts presented herein include collecting training data according to a procedure substantially as follows. A user operating a sensing device invokes an application, API, or service via the sensing device, where the application, API, or service is configured to facilitate the user collecting training data using the sensing device. The sensing device therefore preferably includes a display for displaying a GUI, e.g. including a map and location indicator(s) for the environment where training data will be collected, speakers and/or a microphone to facilitate providing and receiving auditory information, instructions, feedback, etc. to and from the user, and sensors including but not limited to a magnetometer, accelerometer, and gyroscope to detect a user's movement throughout the environment and manipulations of the sensing device.

The application, API, or service requests, upon initiation, that the user provide or select an appropriate two-dimensional map of the environment in which training data will be collected. Upon receiving the user's selection, the map, and/or upon retrieving the map from a knowledge base in response to the user's selection, the sensing device preferably begins scanning the environment to detect any location sensors within range. Either upon detecting a location sensor, or upon passage of a predetermined amount of time (e.g. thirty seconds, sixty seconds, etc.), the sensing device instructs the user to begin moving in a particular direction (or if the user is already in motion, instructs the user to continue moving in the current direction or to change direction and continue movement). Additionally, the sensing device issues an instruction for the user to tilt the device in the direction of travel during movement. The instructions issued by the sensing device may be provided in any suitable form, such as visually via the display, in an auditory fashion via the speakers, haptically via e.g. an oscillating motor integrated with the sensing device, or any combination thereof, as well as equivalents that would be understood by a person having ordinary skill in the art upon reading the present disclosure.

As the user moves around the environment, e.g. which may be detected based on data collected by the magnetometer, gyroscope, and/or accelerometer, the sensing device periodically (e.g. every second, every three seconds, every five seconds, or according to any other appropriate interval that would be appreciated by a skilled artisan reviewing the present descriptions) performs a check to determine whether the user is tilting the sensing device in accordance with the direction of movement (or in accordance with movement, generally). If the user is not properly manipulating the sensing device while moving, a corrective instruction request may be issued to ensure collection of appropriate training data.

On the other hand, if the user is properly manipulating the device during movement, the sensing device continues collecting appropriate location sensor signals from in-range location sensors, e.g. identifying information and received signal strength data.

Based on inertial sensors, e.g., accelerometer, gyroscope, and magnetometer, the sensing device (and/or some other device, e.g. a server or workstation to which the sensing device is communicatively coupled) calculates a location of the sensing device. The location is preferably determined according to a predefined coordinate system covering the environment, such as an (X, Y) Cartesian coordinate system in one approach.

Regardless of the coordinate system used, if any, a timestamp is associated with the location information determined above, and stored, preferably locally on the sensing device and/or remotely, but stored for future use. Upon storing the timestamp and corresponding location information, the sensing device requests, or otherwise determines, whether the user is finished collecting training data. For instance, a prompt asking the user whether the data collection process is complete may be displayed/projected to the user, and the user may provide feedback via the sensing device display, microphone, etc. in various embodiments.

If the user indicates the collection process is complete, all training data (timestamps with associated location sensor data) are stored, e.g. in the cloud, and the procedure is complete.

Otherwise, if the user indicates additional data need be collected, the procedure loops back to issuing the user the instruction to begin/continue moving in a particular direction, and proceeds through the steps mentioned above in an iterative fashion until the user ultimately indicates training data collection is complete.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for cognitive fingerprinting of an indoor environment, the method comprising:
   determining calibration information for using a sensing device within the indoor environment;
   generating instructions corresponding to one or more suggested location sensor placements throughout the indoor environment based at least in part on the calibration information;
   issuing the instructions corresponding to the one or more suggested location sensor placements via the sensing device while a user operating the sensing device navigates the indoor environment; and
   building a sensor signature map based on a respective location of one or more of a plurality of location sensors deployed throughout the indoor environment, wherein the respective location of the one or more of the plurality of location sensors is determined while training the sensing device, and wherein the training comprises:
      instructing a user to move the sensing device around some or all of the indoor environment;
      receiving inertial sensor data from one or more components of the sensing device, the inertial sensor data corresponding to one or more physical manipulations of the sensing device while the user moves around some or all of the indoor environment;
      receiving one or more sensor signals from one or more location sensors deployed throughout the indoor environment; and
      determining the respective location of the one or more location sensors within the indoor environment based at least in part on:
         the received inertial sensor data.

2. The method as recited in claim 1, wherein the calibration information comprises: a pixel to distance ratio defining a distance corresponding to a pixel in a digital image representing a layout of the indoor environment.

3. The method as recited in claim 1, wherein the one or more suggested location sensor placements are further based on one or more received signal strength indicators (RSSIs), each of the one or more RSSIs being received by the sensing device and from a location sensor within the indoor environment.

4. The method as recited in claim 1, wherein the instructions comprise:
   one or more directions for the user to move throughout the indoor environment; and
   an instruction to place a new location sensor in a location where a signal strength received from one or more proximate location sensors is less than a predetermined minimum signal strength threshold.

5. The method as recited in claim 1, comprising configuring one or more identifiers of a plurality of location sensors to be deployed throughout the indoor environment; and
   wherein the identifiers for each location sensor are independently configured in a hierarchical manner defining a location within the indoor environment where the respective location sensor is deployed or will be deployed.

6. The method as recited in claim 1, comprising:
   collecting location sensor signals from a plurality of location sensors while navigating through the indoor environment, each location sensor being positioned at one of the suggested location sensor placements;
   annotating the collected location sensor signals with (X, Y) coordinate location information corresponding to the plurality of location sensors; and
   generating a new set of suggested location sensor placements based on the annotated location sensor signals.

7. The method as recited in claim 6, wherein collecting the location sensor signals comprises the user manually manipulating the sensing device in three dimensions while navigating through the indoor environment, the manipulations indicating physical movement of the user throughout the indoor environment.

8. A computer program product for cognitive fingerprinting of an indoor location includes a computer readable medium having program instructions embodied therewith, wherein the program instructions are executable by a sensing device to cause the sensing device to perform a method comprising:
   determining, using a processor of the sensing device, calibration information for using the sensing device within an indoor environment, wherein the calibration information comprises: a pixel to distance ratio defining a distance corresponding to a pixel in a digital image representing a layout of the indoor environment;
   calibrating one or more parameters of the sensing device based on the calibration information;
   generating, using the processor of the sensing device, instructions corresponding to one or more suggested location sensor placements throughout the indoor environment based at least in part on the calibration information; and
   issuing, via the sensing device, the instructions corresponding to the one or more suggested location sensor placements while a user operating the sensing device navigates the indoor environment.

9. The computer program product as recited in claim 8, wherein the one or more suggested location sensor placements are further based on one or more received signal strength indicators (RSSIs), each of the one or more RSSIs being received by the sensing device and from a location sensor within the indoor environment.

10. The computer program product as recited in claim 8, wherein the instructions corresponding to the one or more suggested location sensor placements comprise:
one or more directions for the user to move throughout the indoor environment; and
an instruction to place a new location sensor in a location where a signal strength received from one or more proximate location sensors is less than a predetermined minimum signal strength threshold.

11. The computer program product as recited in claim 8, comprising program instructions executable by the sensing device to cause the sensing device to configure one or more identifiers of a plurality of location sensors to be deployed throughout the indoor environment; and
wherein the identifiers for each location sensor are independently configured in a hierarchical manner defining a location within the indoor environment where the respective location sensor is deployed or will be deployed.

12. The computer program product as recited in claim 8, comprising program instructions executable by the sensing device to cause the sensing device to:
collect location sensor signals from a plurality of location sensors while navigating through the indoor environment, each location sensor being positioned at one of the suggested location sensor placements;
annotate the collected location sensor signals with (X, Y) coordinate location information corresponding to the plurality of location sensors; and
generate a new set of suggested location sensor placements based on the annotated location sensor signals.

13. The computer program product as recited in claim 12, wherein collecting the location sensor signals comprises the user manually manipulating the sensing device in three dimensions while navigating through the indoor environment, the manipulations indicating physical movement of the user throughout the indoor environment.

14. A system for cognitive fingerprinting of an indoor location, comprising: a processor; and logic integrated with the processor, executable by the processor, or integrated with and executable by the processor, the logic being configured to:
determine calibration information for using a sensing device within an indoor environment;
cognitively collect location sensor data based on one or more user-performed physical manipulations of the sensing device while a user operating the sensing device navigates the indoor environment;
generate instructions corresponding to one or more suggested location sensor placements throughout the indoor environment based at least in part on the calibration information and the location sensor data; and
issue the instructions corresponding to the one or more suggested location sensor placements via the sensing device while the user operating the sensing device navigates the indoor environment.

15. The computer program product as recited in claim 8, wherein the one or more parameters of the sensing device comprise: a pixel to distance ratio parameter; a stride length parameter; and a tilt sensitivity parameter.

16. The system as recited in claim 14, further comprising logic configured to:
collect location sensor signals from a plurality of location sensors while navigating through the indoor environment, wherein each location sensor is positioned at one of the suggested location sensor placements, and wherein collecting the location sensor signals comprises the user manually manipulating the sensing device in three dimensions while navigating through the indoor environment, the manipulations indicating physical movement of the user throughout the indoor environment;
annotate the collected location sensor signals with (X, Y) coordinate location information corresponding to the plurality of location sensors; and
generate a new set of suggested location sensor placements based on the annotated location sensor signals.

17. The system as recited in claim 14, further comprising logic configured to: configure one or more identifiers of a plurality of location sensors to be deployed throughout the indoor environment, wherein the identifiers for each location sensor are independently configured in a hierarchical manner defining a location within the indoor environment where the respective location sensor is deployed or will be deployed.

18. The system as recited in claim 14, wherein the calibration information comprises:
a pixel to distance ratio defining a distance corresponding to a pixel in a digital image representing a layout of the indoor environment;
a stride length corresponding to the user; and
a tilt sensitivity of the sensing device.

19. The system as recited in claim 14, wherein the one or more user-performed physical manipulations of the sensing device comprise the user manually manipulating the sensing device in three dimensions while navigating through the indoor environment;
wherein the one or more user-performed physical manipulations indicate physical movement of the user throughout the indoor environment.

* * * * *